US008892610B1

(12) United States Patent  
Pang

(10) Patent No.: US 8,892,610 B1  
(45) Date of Patent: Nov. 18, 2014

(54) SYSTEM AND METHOD FOR GARBAGE COLLECTION PAUSE REDUCTION

(75) Inventor: Clement Ho Yan Pang, San Jose, CA (US)

(73) Assignee: Google Inc., Mountain View, CA (US)

( * ) Notice: Subject to any disclaimer, the term of this patent is extended or adjusted under 35 U.S.C. 154(b) by 586 days.

(21) Appl. No.: 13/194,733

(22) Filed: Jul. 29, 2011

(51) Int. Cl.
*G06F 12/00* (2006.01)
*G06F 17/30* (2006.01)

(52) U.S. Cl.
USPC ........... 707/813; 707/814; 707/815; 707/816; 707/817; 707/818; 707/819; 707/820

(58) Field of Classification Search
None
See application file for complete search history.

(56) References Cited

U.S. PATENT DOCUMENTS

| | | | |
|---|---|---|---|
| 6,502,109 B1 * | 12/2002 | Aravamudan et al. | 707/206 |
| 6,701,520 B1 | 3/2004 | Santosuosso et al. | |
| 6,874,074 B1 * | 3/2005 | Burton et al. | 711/170 |
| 6,996,590 B2 * | 2/2006 | Borman et al. | 707/206 |
| 7,565,385 B2 | 7/2009 | Chauvel et al. | |
| 2008/0195718 A1 * | 8/2008 | Hu et al. | 709/207 |
| 2011/0208791 A1 * | 8/2011 | Lindholm et al. | 707/817 |

* cited by examiner

*Primary Examiner* — Ajay Bhatia
*Assistant Examiner* — Cheryl M Shechtman
(74) *Attorney, Agent, or Firm* — Honigman Miller Schwartz and Cohn LLP

(57) ABSTRACT

A method to schedule garbage collection operations may be executed in a client/server system using multiple servers. The method includes comparing usage of memory in respective ones of the plurality of servers to one or more memory usage thresholds and dynamically identifying one or more servers in which to perform garbage collection of memory objects during a particular time period. By distributing the durations over which garbage collection is performed on respective servers, the client server system, among other things, reduces the pauses in servicing client requests.

12 Claims, 10 Drawing Sheets

Table 810:

| State | Available Memory (Mb) | Average Allocation Rate (Mb/s) | Instantaneous Allocation Rate (Mb/s) | Sampling Interval (Secs) | Sample Time |
|---|---|---|---|---|---|
| Servicing | 122 | 17.5 | 28.9 | 5.5 | 0:00:00 |
| Servicing | 95.2 | 12.5 | 4.87 | 7.0 | 0:00:05.5 |
| Servicing | 67.9 | 8.3 | 3.90 | 6.5 | 0:00:12.5 |
| Lame Duck | 17.0 | 8.1 | 7.8 | 1.0 | 0:00:19.0 |

(802)

Table 820:

| Server ID | State | Available Memory Mb | Average Allocation Rate (Mb/s) | Instantaneous Allocation Rate (Mb/s) |
|---|---|---|---|---|
| Server 001 | Servicing | 500 | 12.1 | 15.6 |
| Server 002 | Servicing | 415 | 1.1 | 1.1 |
| Server 003 | Non-Servicing | --- | --- | --- |
| Server 004 | Servicing | 122 | 17.5 | 28.9 |
| Server 005 | Servicing | 10 | 6.1 | 3.3 |

Table 830:

| Server ID | State | Margin to Memory Threshold | Avg. Allocation Rate Threshold | Instant Allocation Rate Threshold | Priority |
|---|---|---|---|---|---|
| Server 001 | Servicing | 495 | 5 min | 1.5 min | 4 |
| Server 002 | Servicing | 410 | 6 min | 6 min | 3 |
| Server 004 | Servicing | 112 | 6 sec | 4 sec | 1 |
| Server 005 | Servicing | 85 | 15 sec | 30 sec | 2 |

FIG. 8

| Request ID | Application | Status |
|---|---|---|
| 000003 | Video Data Transcoder | Running |
| 000003 | Database Query Generator | Complete |
| 000003 | Web page generator | Reserved |
| 000004 | Database Query Generator | Running |
| 000004 | Client Location Determiner | Complete |

SYSTEM AND METHOD FOR GARBAGE COLLECTION PAUSE REDUCTION

BACKGROUND

1. Field

Embodiments relate generally to memory management.

2. Background

Client/server systems which allow client applications to request services from a remote server have become prevalent. Client/server systems are generally organized to supply services to a number of requesting clients, and in a typical system, client requests are received by a server farm that includes multiple servers, each capable of providing the requested service.

A server responds to a request for service from a client by executing application programs that provide the requested service or services. During execution, the application programs require allocation of memory for memory objects that store data used by the application program.

Memory objects store instances of data types used by an executing program. Example data types include, without limitation, primitive data types, aggregated data types composed of combinations of one or more primitive data types, data objects that contain encapsulated combinations of data types and associated methods for acting on the data objects, and containers that hold collections of data types. Memory objects are not limited to data objects for object-oriented programming, but can include any data structure that is allocated during execution of a program.

For example, application programs written in the Java programming language include program modules. During program execution, Java program modules can request allocation of memory objects on a heap in virtual memory. Java memory objects can include aggregated data types such as classes that contain composites of primitive data types and other data types, and without member functions, object oriented data objects such as classes that include one or more member functions, and containers (e.g., as lists, arrays, and vectors) that hold collections of data types.

An operating system running on a server allocates memory for the memory objects in response to requests by program modules. A memory allocation pattern for a program module might include allocating of an initial set of memory objects during startup of the program module, and then allocating additional memory objects as required to hold data generated or accessed during program execution.

The memory available for allocating memory objects may be organized as virtual memory, which is a combination of volatile memory (e.g., random access memory) and persistent memory (e.g., memory space on hard drives). Servers have a finite amount of virtual memory available for storing memory objects, and memory used for storing memory objects is typically reclaimed for reuse when the memory objects are no longer needed.

BRIEF SUMMARY

Embodiments relate to memory management in a multi-computer system. Garbage collection, as used herein, is the process of identifying memory objects whose memory can be reclaimed for reuse. Embodiments schedule garbage collection operations in systems including multiple computers.

In an embodiment, a method for processing service requests using a plurality of servers is provided. The method includes comparing usage of memory in respective ones of the plurality of servers to one or more memory usage thresholds, and dynamically identifying, based upon the comparing, one or more servers in which to perform garbage collection of memory objects. The method further includes changing the identified one or more servers to a non-servicing state, and sending incoming service requests to respective ones of the plurality of servers that are not in the non-servicing state.

In an embodiment, the method can further include performing the garbage collection in respective ones of the identified one or more servers, changing respective ones of the identified one or more servers to a servicing state upon completion of the garbage collection on that server; and processing incoming service requests on servers changed to the servicing state.

In an embodiment, a computer program product is provided. The computer program product includes a computer readable medium having computer program logic recorded thereon, that, when executed by a plurality of servers, cause the plurality of servers to process service requests. The recorded computer program logic includes a first logic module configured to compare usage of memory in respective ones of the plurality of servers to one or more memory usage thresholds, and a second logic module configured to dynamically identify, based upon the comparing, one or more servers in which to perform garbage collection of memory objects and to change the identified one or more servers to a non-servicing state. The recorded computer program logic also includes a third logic module configured to send incoming service requests to respective ones of the plurality of servers that are not in the non-servicing state.

In an embodiment, the recorded computer program logic for the computer program product includes a fourth logic module configured to perform the garbage collection in respective ones of the identified one or more servers and to change respective ones of the identified one or more servers to a servicing state upon completion of the garbage collection on that server. The fourth logic module is also configured to cause a server to process said service requests after returning to the servicing state.

In an embodiment, the fourth logic module is further configured to detect, in a first server from the identified one or more servers, completion of processing of pending service requests, and to initiate the garbage collection on the first server after a time interval subsequent to the detecting.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

FIGS. 8 and 9 illustrate example data tables suitable for practicing embodiments.

DETAILED DESCRIPTION

I. Introduction

Figure 1:
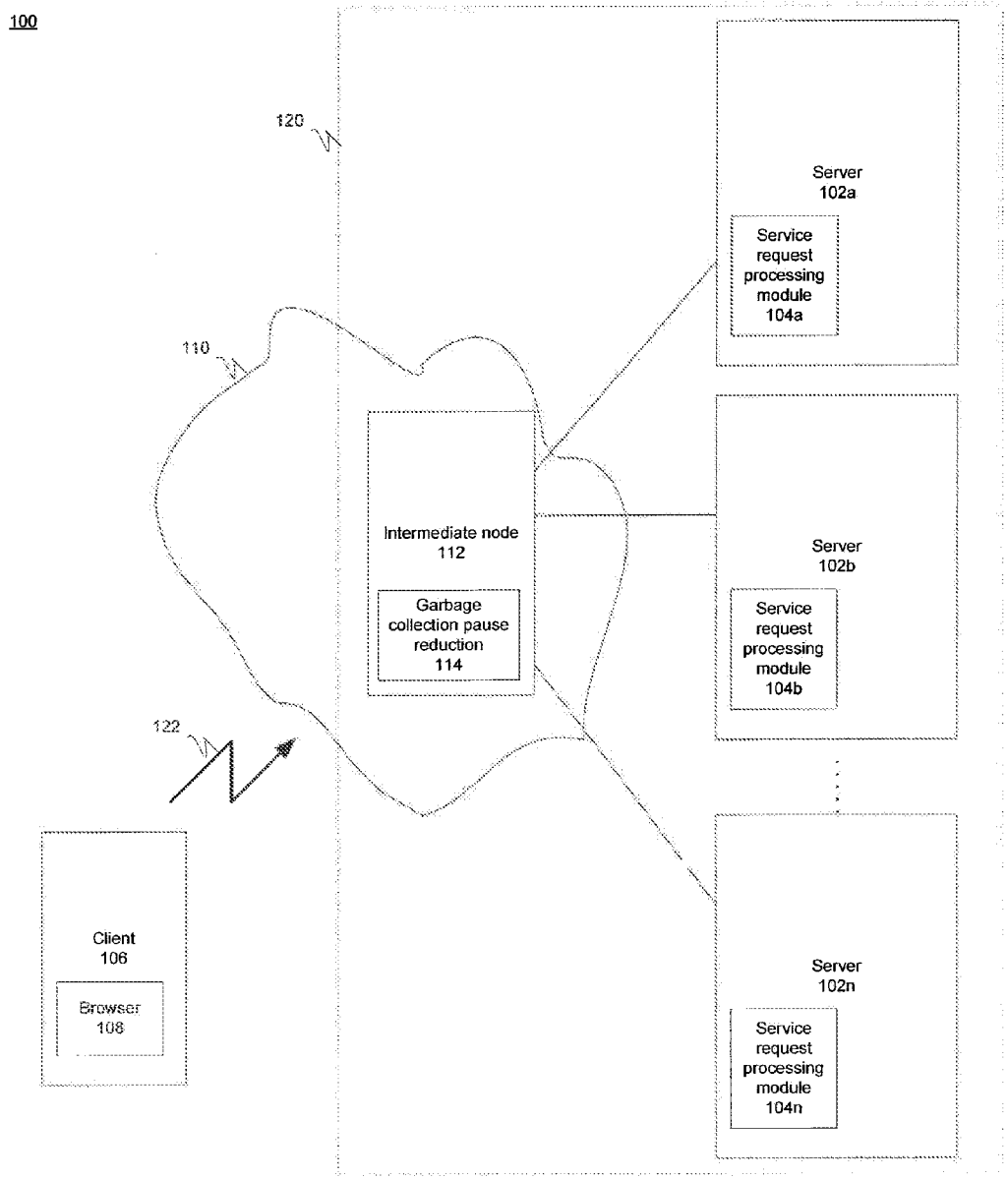
FIG. 1 is an illustration of a system for garbage collection of memory objects, according to an embodiment.

Garbage collection, as used herein, is the process of identifying memory objects whose memory can be reclaimed for reuse. In some programming environments, application developers are responsible for garbage collection and must manually insert code into their applications that deallocates memory objects that are no longer needed. Manual garbage collection is a complex task and errors in implementing can lead to program execution errors that are difficult to identify and correct. Typical errors in using manual garbage collection techniques include attempting to reuse a deallocated memory object, and creating memory leaks by removing all references (e.g., pointers and handles) to an allocated memory object, thereby making memory deallocation of that memory object impossible.

An alternative approach to memory management is to provide garbage collection processes that analyze canning programs to automatically identify and deallocate memory objects that are no longer needed. For example, the Java program environment provides a garbage collector that manages heap memory allocated to memory objects.

The use of programming environments that incorporate automatic garbage collection allows reducing or eliminating errors of the type associated with manual garbage collection techniques. On the other hand, garbage collection processes require resources such as memory and processor time that could otherwise be used to execute application programs. Garbage collection processes may also cause pauses in the execution of application programs.

Embodiments relate to scheduling of garbage collection processes in systems that include multiple computers. Embodiments schedule garbage collection to reduce the effect of garbage collection pauses on a level of service for the system. Although embodiments are described with respect to the Java program language, one of skill in the art will recognize that other programming languages and platforms may also be used.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. System Overview

FIG. 1 is a diagram of a client/server system 100 suitable for practicing an embodiment. System 100 includes a server farm 120 and a client 106.

Client 106 can be a computer that executes applications selected by a user. Applications executing on client 106 can generate requests for services and resources that are hosted remotely from the client.

For example, a user can initiate the execution of browser application 108 on client 106. Using the browser application, the user can request services that are hosted remotely from client 106. For example, the user might initiate a request for remote streaming of a video clip to client 106. Servicing the client's request for streaming the video clip can require executing remotely hosted applications for locating and retrieving the video clip, transcoding the video clip to a video data format compatible with applications for displaying video on client 106, and streaming the transcoded video data to client 106.

Client 106 transmits requests for service over connection 122 to a server farm 120 that includes n servers 102*a*, 102*b*, . . . 102*n*, and intermediate node 112. Connection 122 can be a wired connection, a wireless connection, or connection that includes a combination of wired or wireless paths.

In an embodiment, service requests received by the server farm 120 pass through intermediate node 112 prior to being distributed to one or more of servers 102*a*, 102*b*, 102*n*. Intermediate node 112 is a part of the infrastructure 110 of the server farm 120. For example, intermediate node 112 can a part of front end equipment that receives requests from clients, performs some initial processing of the requests, and distributes the request to one or more servers.

Servers 102*a*, 102*b*, . . . 102*n* each host a respective service request processing module 104*a*, 104*b*, . . . 104*n* configured to analyze and process service requests received by the respective server. Service request processing modules 104*a*, 104*b*, . . . 104*n* determine and schedule the execution of applications and access to resources that are responsive to service requests received by the server farm.

In an embodiment, intermediate node 112 includes a garbage collection pause reduction system 114. Garbage collection pause reduction system 114 schedules garbage collection operations for managing memory on servers 102*a*, 102*b*, . . . 102*n*. In an embodiment, garbage collection pause reduction system 114 schedules the operation of garbage collection routines on servers to control and reduce the impact of garbage collection pauses on the level of service presented to clients.

The embodiment illustrated in FIG. 1 shows a garbage collection pause reduction system on intermediate node 112, however embodiments are not limited to being practiced in this fashion. For example, the functions described as being performed by server garbage collection node can be distributed among one or more of servers 102a, 102b ... 102n.

III. Server Garbage Collection System

Figure 2:
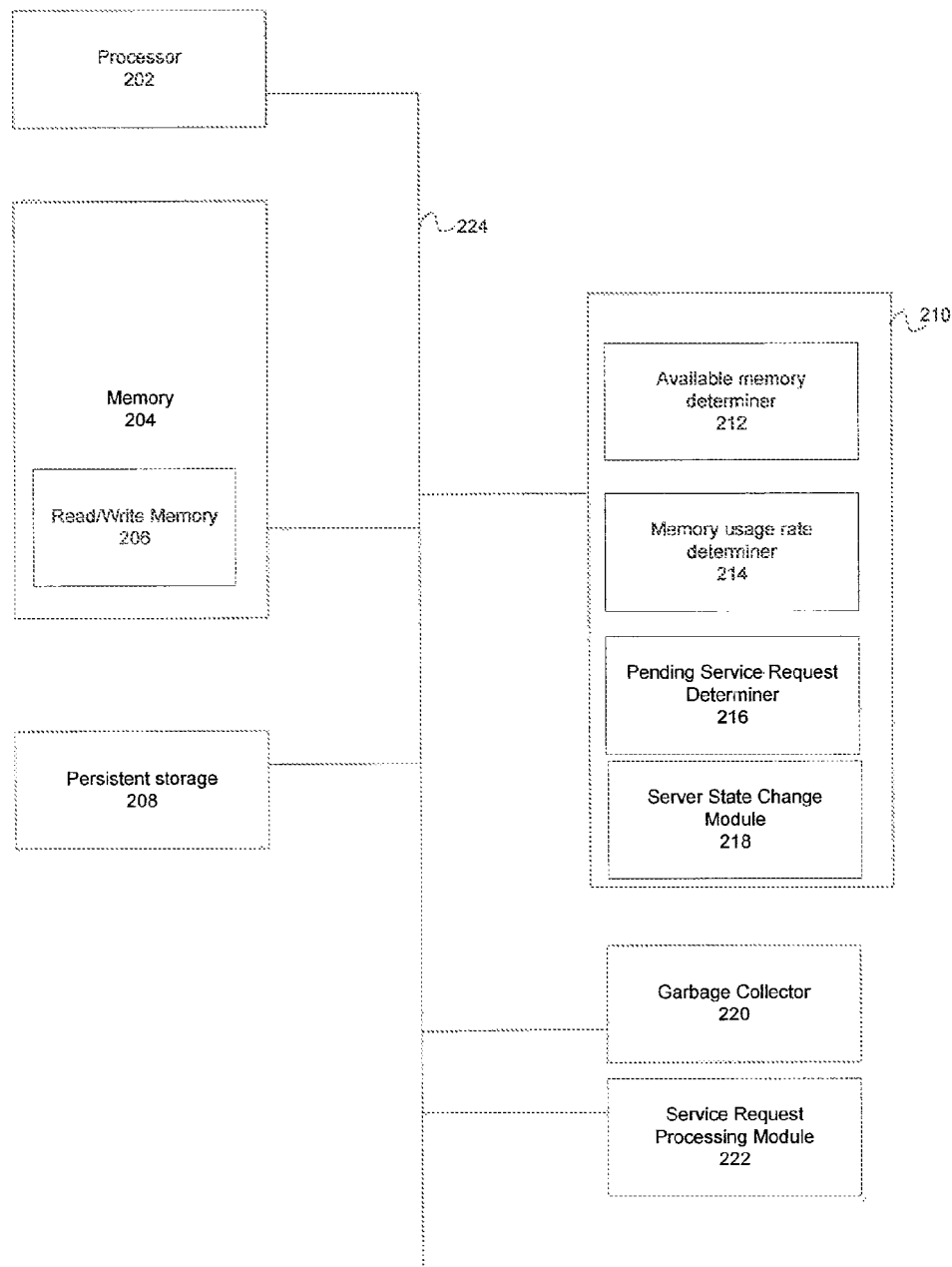
FIG. 2 is an illustration of a server configured for garbage collection of memory objects, according to an embodiment.

FIG. 2 illustrates an example server for practicing an embodiment. According to an embodiment, each server 102a ... 102n includes a processor 202, memory 204, persistent storage 208, garbage collector 220, service request processing module 222, and garbage collection pause reduction system 210. System bus 224 interconnects the components of server 102.

Processor 202 executes program instructions that control the operation of server 102. Processor 202 can include a single central processing unit (CPU) or a plurality of processing units.

Memory 204 includes read only memory (ROM) and read/write memory 206 such as random access memory (RAM).

Persistent storage 208 includes secondary memory for server 102. Persistent storage 208 may be implemented using devices such as internal hard drives, and removable storage units such as flash drives, floppy disks, and removable hard drives.

In an embodiment, memory space for programs implemented by the server are mapped to virtual memory that is implemented using a combinations of one or more of read/write memory 206 and persistent storage 208. Herein the use of the term "memory" encompasses read/write memory 206 and virtual memory.

Service request processing module 222 receives service requests and controls the execution of application programs that are responsive to the received requests.

Garbage collector 220 identifies memory objects in memory 206 that that are determined not to be of further use to programs executing on server 102 and deallocates the identified memory objects, thereby freeing the memory used by those memory objects. Specifically, within a single process in the system, the garbage collector examines the heap of that process to garbage collect entries. The freed memory may be available for reuse. Garbage collectors also defragment the heap by compacting allocated blocks of memory.

Garbage collection pause reduction system 210 schedules the operation of garbage collector 220 and is configured to reduce or minimize the effect of pauses on service requests received by server 102. Garbage collection pause reduction system 210 includes an available memory determiner 212, a memory usage rate determiner 214, and a pending service request determiner 216, and server state change module 218.

Available memory determiner 212 determines the amount of unallocated memory for storing memory objects created by application programs executing on server 102.

Memory usage rate determiner 214 determines the rate at which memory is allocated for memory objects by application programs executing on server 102. In an embodiment, memory usage rate determiner 214 can determine one or more memory usage rates for a server, including, but not limited to, an instantaneous memory usage rate, and one or more statistically determined memory usage rates, such as an average memory rate. As will be described herein, various methods can be employed for determining the rate of memory allocation on a server.

Pending service request determiner 216 determines whether a service request assigned to a server is still pending has not been completed) on the server.

Server state change module 218 is configured to set the state of a server. In an embodiment, server state change module 218 receives information regarding the server and other servers available for request processing, and changes the state of the server to one or more servicing states in which the server can be assigned an incoming service requests or to one or more non-servicing states in which the server is not available to service incoming service requests.

IV. Garbage Collection System

Figure 3:
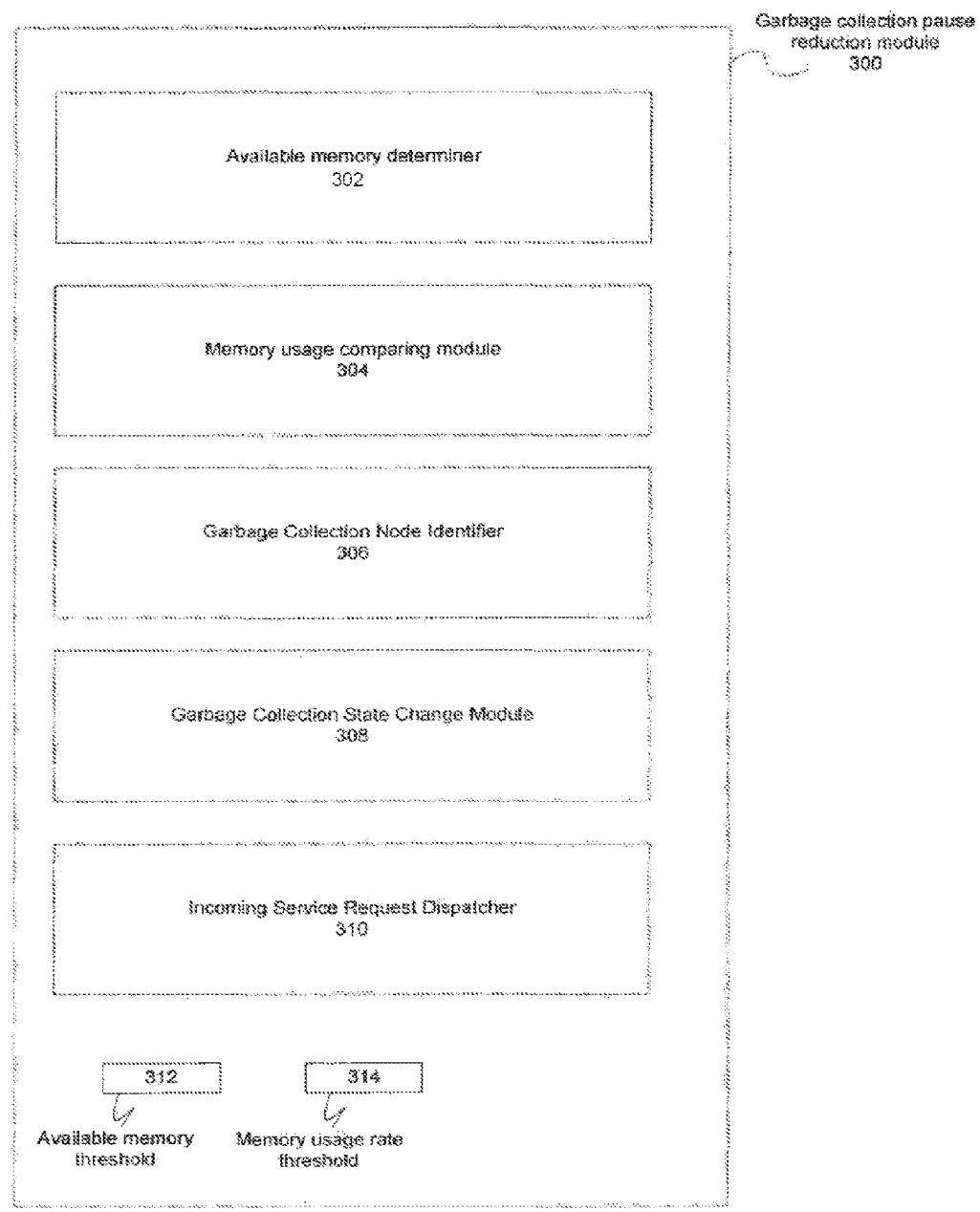
FIG. 3 is an illustration of a garbage collection logic module, according to an embodiment.

FIG. 3. illustrates a garbage collection and reduction pause module that can be implemented on a node of server farm 120. According to an embodiment, garbage collection pause reduction module 300 is implemented on intermediate node 112. Garbage collection pause reduction module 300 includes available memory determiner 302, memory usage comparing module 304, garbage collection node identifier 306, garbage collection state change module 308, and incoming service request dispatcher 310. Garbage collection pause reduction module 300 also includes available memory threshold setting 312 and memory usage rate threshold setting 314.

In an embodiment, available memory determiner 302 determines the available memory for each server of server farm 120. For example, available memory determiner 302 can be configured to receive available memory information and memory usage rate information from available memory determiners 212 and memory rate usage rate determiners 214 of servers 102a-n.

Memory usage comparing module 304 compares memory usage information and memory usage rate information to available memory threshold setting 312 and memory usage rate threshold setting 314 for each server of server farm 120.

Garbage collection node identifier 306 can be configured to dynamically generate a list of servers of server farm 120 and to assign to each server a priority based on dynamically updated memory usage information describing the proximity of the server to a memory threshold.

In an embodiment, server farm garbage collection pause reduction module 300 includes a garbage collection state change module 308 configured to change one or more servers identified by garbage collection node identifier 306 to a non-servicing state in which the so identified servers are not directed to process new service requests, or to a servicing state in which service requests are processed by the server.

Service request dispatcher 310 assigns including service requests to one or lore of the servers of server farm 120 that process service requests.

V. Methods

Figure 4:
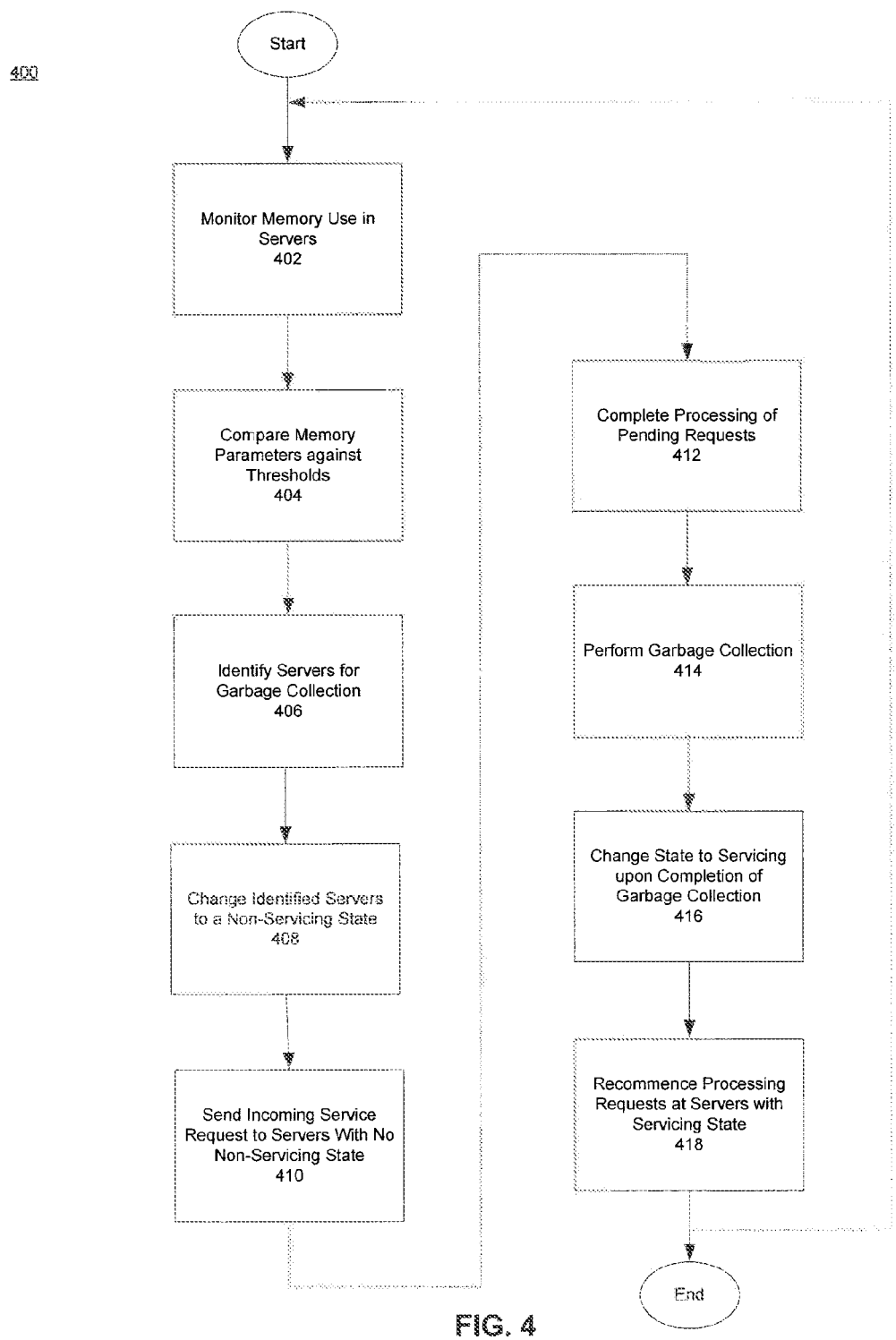
FIG. 4 is a flowchart illustrating methods for garbage collection of memory objects according to an embodiment.

FIG. 4 is a flowchart of an exemplary method 400 for scheduling garbage collection in a multiple computer system. For ease of explanation, method 400 is described with respect to the client/server system illustrated in FIGS. 1, 2, and 3. One having skill in the relevant arts and apprised of the teachings herein, will understand that method 400 can be performed on other systems.

Method 400 begins at step 402 with monitoring the memory usage in servers.

In an embodiment, each server 102a-n of server farm 120 includes a garbage collection pause reduction system 210 that includes, among other things, available memory determiner 212 and memory usage rate determiner 214.

Available memory determiner 212 can be configured to determine the amount of unallocated memory for storing memory objects created by application programs executing on a server. Memory usage rate determiner 214 can be configured to determine the rate at which memory for memory objects is being allocated a server.

Figure 6:
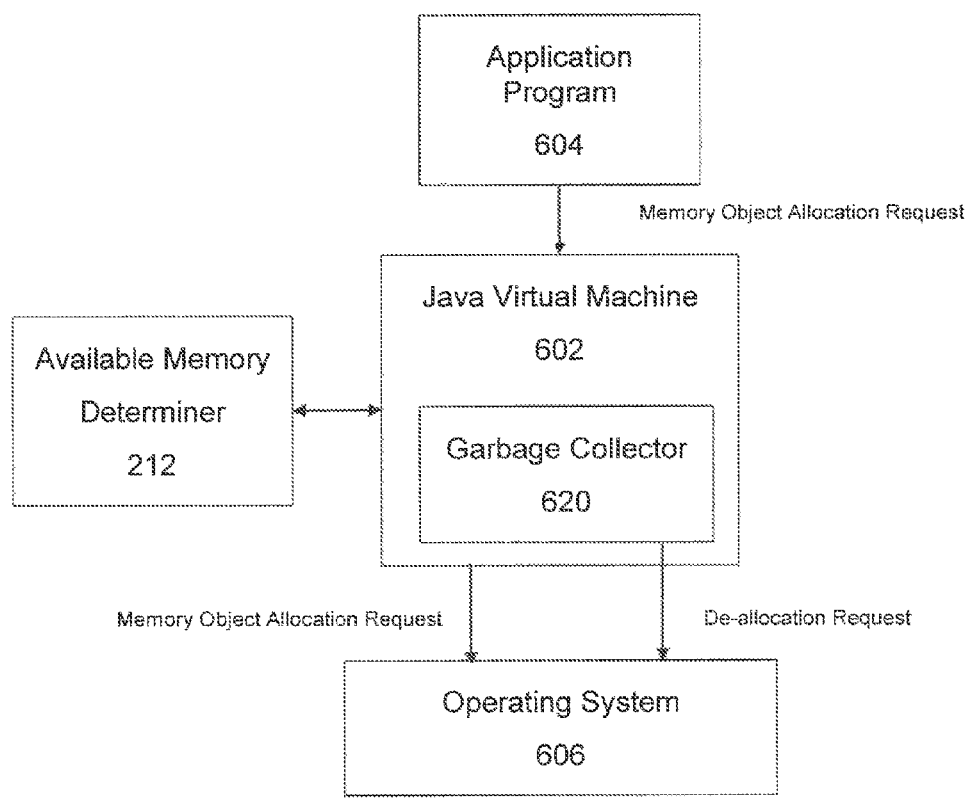
FIG. 6 is a block diagram illustrating a Java environment suitable for practicing an embodiment.

FIG. 6 illustrates a Java based system suitable for practicing an embodiment. In an embodiment, servers 102a-n each hosts a Java Virtual Machine (JVM) 602 for executing an application program 604 implemented in the Java programming language. The instructions of application program 604 are expressed as Java byte code. Java virtual machine 602 executes application program 604 by requesting the services described by the Java byte code from operating system 606.

For example, during the execution of application program 604, the instructions can request creation of memory objects. JVM 602 allocates memory for the memory objects by issuing a request to operating system 606 and receiving a confirmation that operating system 606 has allocated the requested memory. JVM can be configured to store information regarding requests for memory granted by operating system 606.

JVM 602 includes garbage collector 620 that monitors the execution of application program 604 and requests the deallocation from the heap of memory objects that are no longer used by application program 602. Available memory determiner 212 can be configured to access data structures created by JVM 602 and garbage collector 620 to determine the memory available for the future creation of memory objects.

In an embodiment, garbage collector 620 is a generational garbage collector for a JVM system. Generational garbage collectors take advantage of the observation that newly created memory objects are typically the objects that most quickly become unreachable by application programs and eligible for reclaiming by the garbage collector. In particular, generational garbage collectors classify memory objects into generations based on the number of rounds of garbage collection the memory objects have survived, and employ different garbage collection strategies on younger generations memory objects than are applied on later generation memory objects.

In an embodiment employing a Java virtual machine, available memory refers to amount of available Java heap memory assigned provided on the server in the total memory space.

Figure 7:
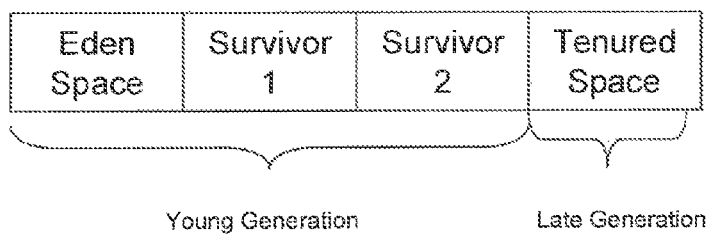
FIG. 7 is a block diagram illustrating categories of memory objects for a garbage collector suitable for practicing an embodiment.

FIG. 7 illustrates generations in a Java garbage collector suitable for practicing an embodiment. The Java garbage collection can be configured to classify allocated memory objects in two generations, a first "young" generation, and a second later (e.g., tenured) generation. The young generation includes the Eden, survivor 1 and survivor 2 stages, while the late generation includes the tenured stage.

The Eden stage of the young generation holds objects that were created during program startup or after a previous garbage collection operation. Memory objects in the Eden stage that survive a garbage collection operation are promoted to survivor stage 1. Memory objects surviving a second garbage collection operation are advanced to survivor stage 2, and memory objects surviving a third or subsequent garbage collection stage are promoted to the tenured stage in the later generation.

In an embodiment, garbage collector 620 can be configured to establish a heap size for the younger generation memory objects such that garbage collection operations on the younger generation memory objects are kept manageably short with garbage collection cycles being performed frequently.

On the other hand, garbage collection cycles on tenured memory objects generally require more in depth analysis to identify memory objects that will not be accessed by executing program modules. Java garbage collector 620 can use a mark-sweep-compaction algorithm for reclaiming late generation memory objections. The garbage collection of tenured objects can produce pauses in the execution application programs executing in the JVM 602.

Referring again to FIG. 2, available memory determiner 212 can be configured to update a table on the respective server with information on the available memory for the server. Table 810 of FIG. 8 is an example data table.

Table 810 includes a number of records 802 that each store available memory information determined at a given time. In an embodiment, available memory determiner 212 can be configured to create a new record in table 810 and to update the new record to reflect the determined value for the available memory on the server and the time at which the available memory determination was made.

Memory usage rate determiner 214 can be configured to determine rates at which memory is allocated for memory objects by application programs executing on server 102. In an embodiment, memory usage rate determiner 214 can retrieve information from table 810 and can determine memory usage rates from the available memory and time information stored in table 810 by available memory determiner 212. In an embodiment, memory usage rate determiner 214 can measure an instantaneous memory usage rate by detecting the change in available memory at the start and end of a time interval. Memory usage rate determiner 214 can be configured to determine an average or other statistically-determined usage interval rate in a window period from the calculated instantaneous memory rates for two or time intervals within the window period. In a further embodiment, memory usage rate determiner 214 can be configured to apply weight values to the individual values for available memory rate when calculating an average memory rate. For example, memory usage rate determiner 214 may apply larger weights to more recent memory values than are applied to less recent memory rate values.

In an embodiment, memory usage rate determiner 214 can determine a memory usage rate based on known memory usage patterns for applications that are executed on the server. For example, memory usage rate determiner 214 can examine information in a request for service received by service request processing module 222 and pending for service by a server to identify one or more application modules that will be executed on the server to service the pending request. Memory usage rate determiner 214 can retrieve pre-stored information describing the known memory usage pattern for executing the identified application modules and can be configured to determine memory object allocation rates based on the known memory usage patterns.

In an embodiment, memory usage rate determiner 214, and available memory determiner 212 are configured make repeated determinations of the available memory and memory usage rates during the execution of application programs on the server and to update table 810 to reflect each determination. In an embodiment, the interval between determinations is determined based on the previously measured values for available memory and usage rate such that a next measurement is made prior to the expected time for exceeding a memory threshold.

In an embodiment, available memory determiner 302 determines the available memory for each server of server farm 120. For example, available memory determiner 302 can be configured to receive available memory information and memory usage rate information from available memory determiners 212 and memory usage rate determiners 214 of servers 102a, 102b, and 102c. The determinations of available memory and usage are repeated periodically by the server, and updated information regarding memory usage is periodically provided to memory usage comparing module 304.

In step 404 of method 400, memory usage information parameters are compared to a threshold for memory usage for each of the servers.

In an embodiment, memory usage comparing module 304 can be configured to compare memory usage parameters for the servers to one or more memory usage thresholds and to identify servers that are approaching a memory threshold.

Table 820 of FIG. 8 shows an example table for storing server information for the servers of the server farm 120. Table 820, contains records for each server, and includes fields for storing current values for available memory, average memory allocation rate, and instantaneous allocation rate.

Referring again to FIG. 3, memory usage comparing module 304 can be configured to compare the memory usage of each server of server farm 120 to thresholds values established for available memory. In an embodiment, memory usage comparing module 304 retrieves available memory and usage rate information for each server of server farm 120 from available memory determiner 302 and compares the information to available memory threshold setting 312 and memory rate threshold setting 314 for each of the servers.

Memory usage comparing module 304 can be configured to determine which servers are approaching one or more thresholds for memory usage based on the comparison. The comparison thresholds can include, but are not limited to, a percentage of total memory allocated for memory objects on a server, estimated time to reach a percentage of total memory allocated for a server based on an average usage rate memory, estimated time to reach a percentage of total memory allocated for a server based on an instantaneous memory usage, and time to reach an estimated memory usage rate. In an embodiment, the threshold limits are selected such that the that limits are reached prior to exhausting the memory on a server. According to an embodiment, the threshold settings are at the servers are randomly distributed so that even if the servers have similar memory capacity and usage patterns, they will be flagged for garbage collection by garbage collection node identifier 306 at different times.

Method 400 continues in step 406 with identifying servers for garbage collection. In an embodiment, garbage collection node identifier 306 can be configured to identify one or more of servers 102a-n as being closest to a memory threshold and/or as having a shortest estimated time to exceeding a memory threshold.

Garbage collection node identifier 306 can be configured to dynamically generate a list of servers of server farm 120, that assigns to each server a priority based on dynamically updated memory usage information describing the proximity of each server to a memory threshold. In an embodiment, garbage collection node identifier 306 designates one or more of the highest priority servers as candidates for initiating garbage collection.

Garbage collection node identifier 306 receives memory usage comparison information from memory usage comparing module 304 and identifies servers that are approaching one or more memory usage thresholds. In an embodiment, garbage collection node identifier is configured to generate a list of servers that identifies one or more servers that are estimated to have exceeded a memory threshold or that are estimated to reach a memory threshold in the shortest time.

Table 830 of FIG. 8 shows an example table suitable for storing the list of servers stored by garbage collection node identifier 306 in an embodiment. Table 830 contains a record for each server currently in the servicing state. Fields in each record indicate the proximity to one or memory thresholds. Table 830 includes a priority field that identifies servers having the highest priority for initiation of a garbage collection cycle. For example, table 830 indicates that servers 004 and 005 have the highest priority for conducting a garbage collection operation. In an embodiment, garbage collection node identifier 306 is configured to assign priority values base on the proximity of the servers to one or more memory thresholds.

In an embodiment, garbage collection node identifier 306 dynamically updates the list of servers as the garbage collection pause reduction module 300 receives new memory usage information and new information on the state of the servers. Memory usage comparing module 304 periodically receives updated memory usage information from available memory determiner 302, as new memory usage information is provided from the garbage collection pause reduction module 210 on each of the servers. In response to receiving updated comparison information from memory usage comparing module 304, garbage collection node identifier 306 generates an updated list of servers identified for initiation of a garbage collection operation.

In step 408 of method 400, one or more servers identified for garbage collection are changed to a non-servicing state.

In an embodiment, garbage collection state change module 308 receives the node identifying information generated by garbage collection node identifier 306 and initiates an update in the status of one or more of the servers.

For example, garbage collection node identifier 306 may identify server 102a as having the highest priority for initiating a garbage collection node cycle among the servers of server farm 120. Garbage collection state change module 308 can update information stored on server farm 120 indicating that server state 102a is in a non-serving state for receiving service requests, and can transmit a message to server 102a indicating the change of state and/or commence garbage collection.

Referring again to FIG. 8 and table 820, garbage collection state change module 308 can be configured to update the state field in table 820 to indicate the change in status of a server. For example, in the illustrated table, server 003 is in a non-servicing state, while servers 001, 002, 004, and 005 are in the servicing state.

Garbage collection state change module 308 can be configured to select which servers are to be changed to a non-servicing state. This can be based upon which of the servers that are near a configured memory threshold. In an embodiment, garbage state change module 308 can be configured to select the number of servers to change to a non-servicing state based on a desired level of service.

For example, one metric for the level of services presented by server farm 120 is the number or percentage of overall servers available to service a client request. For example, if a lower service level is acceptable, garbage collection state change module 308 can be configured to allow a larger number of servers to change to a non-servicing state at closely spaced times. Garbage collection state module 308 can be configured to select a smaller number of servers to support a requirement for a higher targeted level of service or availability.

Garbage collection state change module 308 can be configured to access a table indicating the current state of each server and to update the table to change the indicated state of server 102a, from a servicing state to a non-servicing state in response to the indication that server 102a has the highest priority for initiation of a garbage collection operation.

In an embodiment, each server 102a-n includes a server state change module 218 that updates server status information indicating that respective server is in servicing state or one or more non-servicing states. For example, the servicing state for a server can be the state in which a server is available for assignment of newly received service requests, while the non-servicing states can include a lame duck state in which the server completes requests currently assigned to the server but is not available to receive assignment of a newly received service request, and a garbage collecting state in which a garbage collection process is running on the server and in which state the server is not available for servicing newly received service requests.

For example, in response to receiving information that garbage collection state change module has updated table 820 to indicate that the state of a server has been changed to the non-servicing state, server state change module 218 can update the server status information field of table 810 to indicate that the respective server is in a lame duck state.

Method 400 continues in step 410 with sending incoming service requests to servers that are not in a non-servicing state.

In an embodiment, incoming service request dispatcher 310 receives incoming service requests and dispatches them to one or more servers of server farm 120. In an embodiment, service request dispatcher 310 is configured to assign an incoming request to a single one of the servers. Incoming service request dispatcher 310 receives state information from garbage collection state change module 308 regarding the current state of servers 102a, 102b, and 102c and assigns the request to a server in an active state (i.e., not in a non-servicing state).

In another embodiment, server state is maintained on each of the servers and incoming service request dispatcher 310 can be configured to transmit a service request to a candidate server without regard for the server state. Servers 102a-n of server farm 120, can be configured to transmit a refusal message back to incoming service request dispatcher 310 in response to receiving a request for service when in a non-servicing state, and incoming service request dispatcher 310 can be configured to respond to refusal messages by selecting another server of the service farm to service the request.

Method 400 continues in step 412 with the completing of processing of any pending requests on a server in a non-servicing state.

In an embodiment, pending service request determiner 216 is configured to determine the completion status of service requests assigned to server 102. Various methods can be used to determine whether a service request is pending (i.e., has not yet been completed) on a respective server. For example, pending service request determiner can be configured to maintain a list of instances of application programs responsive to service requests assigned to server 102, and to update the list to indicate a status of reserved (i.e. requested but not yet initiated), running, and complete for each application program instance. Pending service request determiner 216 can be configured to generate an output signal indicating whether any program instance for a server has not yet been completed based on the list of program instances for the respective server.

Referring to FIGS. 1 and 3, garbage collection state change module 308 can update state information for server 102a indicating that the server will be placed in a non-servicing state. Server state change module 218 of server 102a can change the status of server 102a to the lame-duck state. Pending service request determiner 216 on server 102a can be configured to determine whether the state of all application instances associated with service requests assigned to server 102a based on information in a table describing the application instances initiated on the server.

Table 900 of FIG. 9 is an example table for storing application instance status and suitable for practicing embodiments. A record of table 900 is associated with each application instance that executes on the server. Fields in each record identify a request received by the server, an application instance associated with the request, and the completion status for the application instance.

In an embodiment, pending service request determiner 216 is configured to update table 900 to indicate the initiation and completion of application instances and to determine whether any application instances associated with service requests assigned to the server are executing based on the entries in table 900.

For example, in response to a determination that applications instances associated with pending requests are pending for execution or are executing on server 102a, pending service request determiner 216 updates table 810 on server 102a to indicate that server 102a is in a lame duck state. While in the lame duck state, currently running application instances continue to execute on server 102a. Pending service request determiner 216 can detect the completion of execution of application instances on server 102a and updates table 900. Upon a determination that all application instances required to service requests assigned to the server have completed execution, pending service request determiner 216 can be configured to generate an output indicating that all requests assigned to server 102a have been serviced.

Method 400 continues in step 414 with performing garbage collection on a server of the server farm. In an embodiment, server status for a respective server is placed in a garbage collection state upon a determination by pending service request determiner 216 that all pending service requests have been serviced.

Server state change module 218 can be configured to update the state information in table 810 from lame duck to garbage collection upon receiving a determination result from pending service request determiner 216 that the server has completed its response all pending requests assigned to the server.

Garbage collector 220 initiates a garbage collection operation in response to the change in state of the server to the garbage collection state. For example, a garbage collection may be initiated based upon when the pending requests are completed. In an embodiment, garbage collection pause reduction system 210 can be configured to delay the initiation of the garbage for a random selected time interval after the determination that the servicing of pending requests has been completed. For example, server state change module 218 can be configured to delay the update of status from lame duck to garbage collecting for the randomly selected time interval. Alternatively, garbage collector 220 can be configured to delay the initiation of a garbage collection cycle for a randomly selected time interval after server status has been updated from lame duck to garbage collection.

Garbage collector 220 can be configured to initiate a garbage collection operation on a server in response to a determination that the server is in a garbage collection state.

In an exemplary embodiment, respective servers 102a-n of server farm 120 host a JVM for executing Java applications. Garbage collector 220 can be configured to initiate a garbage collection operation of one generation of memory objects on the memory heap. For example, garbage collector 220 may initiate an operation to identify late generation memory objects for reclamation by the operating system and to request deallocation of the identified memory objects.

Method 400 continues in step 416 with changing the state of a server upon completion of garbage collection. In an embodiment, garbage collector 220 detects that the garbage collection operation initiated by garbage collector 220 has been completed on a server. In response, server state change module 218 updates table 810 to indicate that the server has returned to the servicing state in which the server is available to accept an incoming request for service. In an embodiment, garbage collection state change module 308 updates table 820 to indicate that the server has returned to a servicing state in response to the detected completion of the garbage collection operation.

Method 400 continues in step 418 with recommencing processing server requests at a server in servicing state.

In an embodiment, incoming service request dispatcher 310 can determine that a server of server farm 120 has returned to the servicing state from state information in table 820, and can assign an incoming service request to the respective server. In another embodiment, incoming service request dispatcher 310 can dispatch a request to a server of server farm 120 without regard for whether the respective server is in a servicing or non-servicing state, and the server can accept the service request in response to a determination by server garbage collection pause reduction system 210 that the server is in a servicing state based on information in table 810.

Figure 5:
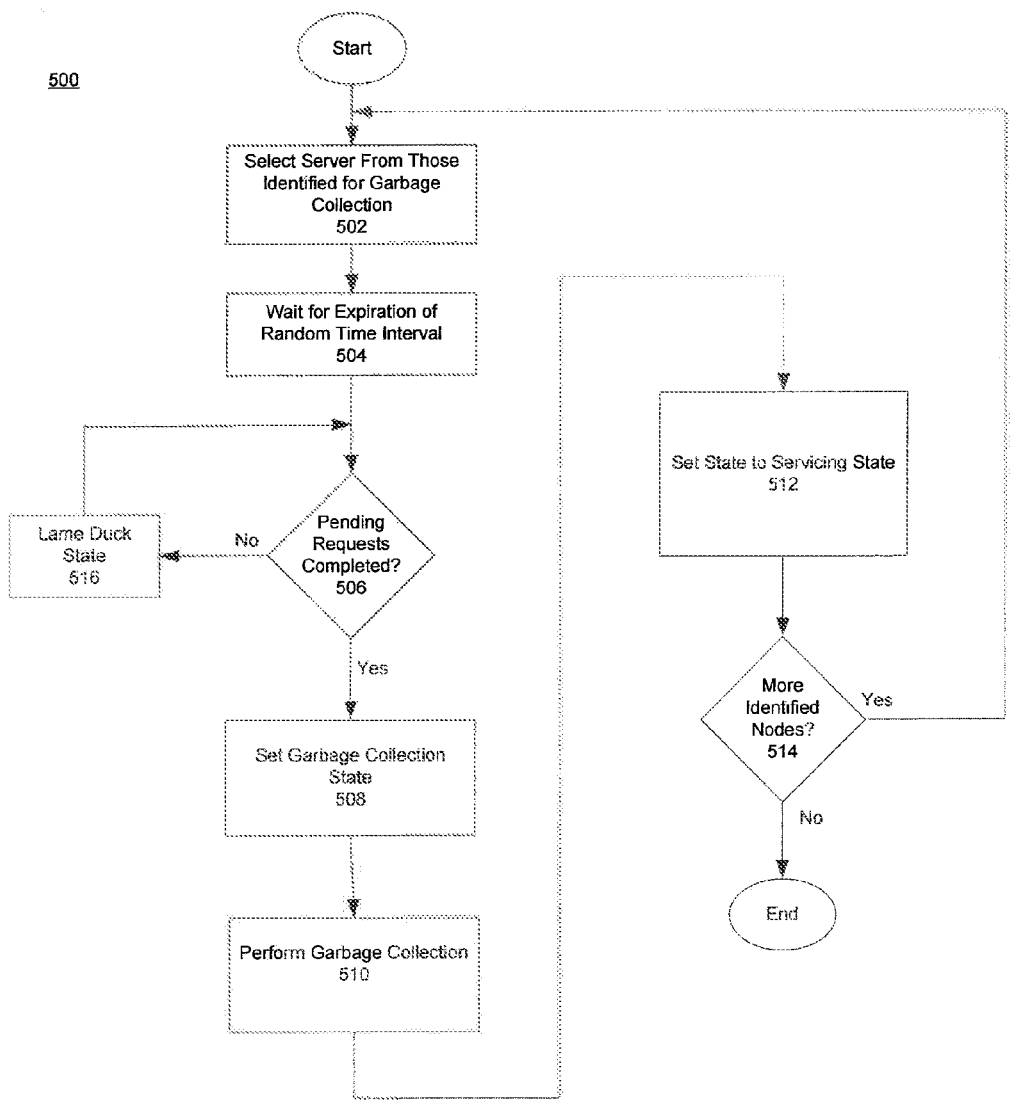
FIG. 5 is flowchart illustrating methods for garbage collection of memory objects according to another embodiment.

FIG. 5 illustrates another method 500 in accordance with an embodiment. For ease of explanation, method 500 is described with respect to the client/server system illustrated in FIGS. 1, 2, and 3. One having skill in the relevant arts and apprised of the teachings herein, will understand that method 500 can be performed on other systems.

Method 500 begins in step 502 with selecting a server from those identified for garbage collection. In an embodiment, server farm garbage collection node identifier 306 can be configured to identify one or more servers that should have high priority for garbage collection based on the proximity of memory allocation levels on the server to a threshold for available memory. As described above, the thresholds for available memory at the respective servers may be randomized.

Method 500 continues in step 504 with optionally waiting for the expiration of a random time interval for placing a server in a non-servicing state. According to another embodiment, method 500 may continue to step 506 after step 502.

In an embodiment, garbage collection state change module 308 can be configured to delay the change of state of each identified server to a non-servicing state by a time interval. In an embodiment, the time interval is selected to separate the time at which the servers enter a non-servicing state in order to provide the targeted level of service. In another embodiment, garbage collection state change module 308 can be configured to select a random time interval for each server, the random time interval generated by an algorithm that provides a selected mean value for the time interval to provide a high probability that the targeted level of service to be presented to clients is met.

In a further embodiment, the random time interval may be based on a level of available memory, and a rate of memory consumption for at least one of the identified one or more servers. For example, random time intervals may be selected for a number of the identified servers with smaller random time intervals being assigned to servers that are closest to exceeding a memory threshold based on the level of available memory, and a rate of memory consumption for the respective servers and larger random time intervals to servers that are farthest from exceeding a memory threshold based on the level of available memory, and a rate of memory consumption.

Method 500 continues in decision block 506 with determining whether pending requests assigned to the server have been completed.

In an embodiment, pending service request determiner 216 can be configured to determine whether any application instances responsive to requests assigned to the server are executing on the server.

Upon a determination that one or more application instances for service requests are executing on the server, method 500 continues along the "No" path from decision block 506 to step 516 with setting the state of the server to the lame duck state and returning to decision block 506 to make a new determination of whether pending service requests have been completed.

Upon a determination that all application instances for service requests have completed their execution on the server, method 500 continues along the "Yes" path from decision block 506 to step 508 with setting the state of the server to the garbage collection state. In an embodiment, server state change module 218 can be configured to change the state of the respective server to the garbage collection state. In an embodiment, the method for changing the server state is similar to the method described above with reference to FIG. 4.

Method 500 continues in step 510 with performing a garbage collection operation on the selected server.

In an embodiment, garbage collector 220 initiates a garbage collection operation on the selected server. For example, garbage collector 220 may be a garbage collector for a JVM and can be configured to trigger a collection of late generation Java memory objects on a server in response to the setting of the state of the server to the garbage collection state. In an embodiment, the method for initiating garbage collection on a server is similar to the method described above with reference to FIG. 4.

Method 500 continues in step 512 with setting the state of the server to the servicing state upon completion of the garbage collection operation. In an embodiment, upon being set to the servicing state, a server of the server farm is configured to receive new request for service. In response to a server being set to the servicing state, garbage collection state change module 308 can update state information in intermediate node garbage collection pause reduction module 300 to indicate that the server has been returned to a servicing state.

Method 500 continues at decision block 514 with determining whether there are more identified servers. In an embodiment, garbage collection node identifier 306 can be configured to determine whether there are additional servers on the generated list of identified servers after updating the list to reflect the completion of a garbage collection operation on the previously selected server. Garbage collection node identifier 306 may also update the generated list of identified servers to reflect current memory usage information. Upon a determination that there are no additional identified servers, process 500 ends. Upon a determination that there are additional identified servers, process 500 returns to step 502 to select one or more of the identified servers.

VI. Example Computer System

Embodiments shown in FIGS. 1-3, or any part(s) or function(s) thereof, may be implemented using hardware, software modules, firmware, tangible computer readable media having instructions stored thereon, or a combination thereof and may be implemented in one or more computer systems or other processing systems.

Figure 10:
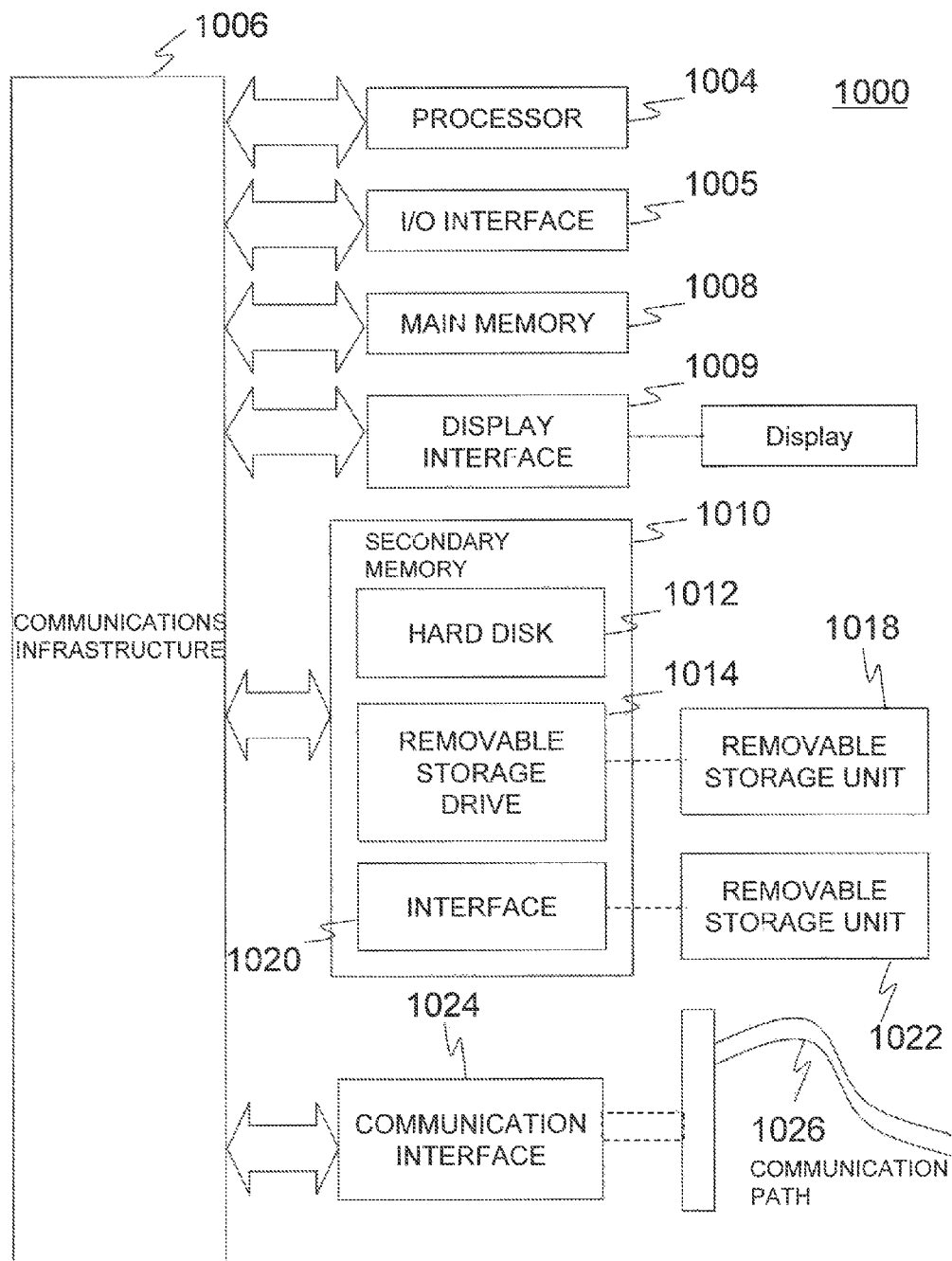
FIG. 10 is a block diagram illustrating a computer system for implementing components and systems according to embodiments.

FIG. 10 illustrates an example computer system 1000 in which embodiments, or portions thereof, may be implemented as computer-readable code. For example, the servers and clients shown in FIG. 1 can each be implemented in computer system 1000 using hardware, software, firmware, tangible computer readable media having instructions stored thereon, or a combination thereof and may be implemented in one or more computer systems or other processing systems. One or more components, such as the server garbage collection pause reduction system 210 and server farm garbage collection pause reduction module 300, and their subsystems shown in FIGS. 2 and 3 can be implemented using computer system 1000. Hardware, software, or any combination of such may embody any of the modules and components in FIGS. 1-3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 1000. After reading this description, it will become apparent to a person skilled in the relevant art how to implement other embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme.

Computer system 1000 also includes a main memory 1008, for example, random access memory (RAM), and may also include a secondary memory 1010. Secondary memory 1010 may include, for example, a hard disk drive 1012, removable storage drive 1014. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art, removable storage unit 1018 includes a computer readable storage medium having stored therein computer software and/or data. For example the data tables shown in FIGS. 8 and 9, and instructions that cause the computer to execute methods shown in FIGS. 4 and 5 may be stored in one or more computer readable storage medium.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000. For example, the virtual memory forming parts of embodiments described herein includes readable/writable components of main memory 1008 and secondary memory 1010 such as RAM and storage space on hard disks.

Computer system 1000 can include a display interface 1009 for interfacing a display unit to computer system 1000. The Display unit can be any device capable of displaying visually displayed information according to embodiments, and compatible with display interface 1009. Examples of suitable displays include liquid crystal display panel based devices, cathode ray tube (CRT) monitors, organic light-emitting diode (OLED) based displays, and touch panel displays.

Computer 1000 can include an I/O device interface 1005 that represents general and customized interfaces that allow processor device 1004 to send and/or receive data from external devices, such as microphones, touch-sensitive displays, transducers, card readers, tape readers, voice or handwriting recognizers, biometrics readers, cameras, portable mass storage devices, and other computers.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in the form of signals, which may be electronic, electromagnetic, optical, or other signals capable of being received by communications interface 1024. These signals may be provided to communications interface 1024 via a communications path 1026. Communications path 1026 carries signals and may be implemented using wire or cable, fiber optics, a phone line, a cellular phone link, an RF link or other communications channels.

In this document, the terms "computer program medium" and "computer readable medium" are used to generally refer to storage media such as removable storage unit 1018, removable storage unit 1022, and a hard disk installed in hard disk drive 1012. Computer program medium and computer readable medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communications interface 1024. Such computer programs, when executed, enable computer system 1000 to implement embodiments as discussed herein. In particular, the computer programs, when executed, enable processor device 1004 to implement the processes of embodiments, such as the stages in the methods illustrated by flowcharts 400 and 500 of FIGS. 4 and 5, respectively, discussed above. Accordingly, such computer programs represent controllers of the computer system 1000. Where embodiments are implemented using software, the software may be stored in a computer program product and loaded into computer system 1000 using removable storage drive 1014, interface 1020, and hard disk drive 1012, or communications interface 1024.

Embodiments also may be directed to computer program products comprising software stored on any computer readable medium. Such software, when executed in one or more data processing devices, causes a data processing device(s) to operate as described herein. Embodiments can employ any computer useable or readable medium. Examples of non-transitory computer readable media include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.). Other types of computer readable media include communication mediums (e.g., wired and wireless communications networks, local area networks, wide area networks, intranets, etc.).

In an embodiment, computer program logic is recorded on a computer readable medium. The computer program logic when executed by a plurality of servers, can cause the servers to execute the methods 400 and 500 illustrated in FIGS. 4 and 5, respectively. For example the computer program logic can include a first logic module that when executed compare usage of memory in respective ones of the plurality of servers to one or more memory usage thresholds, a second logic module configured to dynamically identify, based upon the comparing, one or more servers in which to perform garbage collection of memory objects. The second logic module can be farther configured to change the identified one or more servers to a non-servicing state. The computer program logic can contain a third module that when executed sends incoming service requests to respective ones of the plurality of servers that are not in the non-servicing state.

In an embodiment, the computer program logic can include a fourth logic module that when executed in a system having a plurality of servers performs the garbage collection in respective ones of the identified one or more servers and changes change respective ones of the identified one or more servers to a servicing state upon completion of the garbage collection on that server, and processes incoming service requests on the servers changed to the servicing state. The fourth logic module can be further configured to detect, in a first server from the identified one or more servers, completion of processing of pending service requests, and to initiate the garbage collection on the first server subsequent to the detecting.

VIII. Conclusion

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of processing service requests in a system using a plurality of servers, comprising:
    comparing usage of memory in respective ones of the plurality of servers to one or more memory usage thresholds;
    dynamically identifying, based upon the comparing, one or more servers in which to perform garbage collection of memory objects;
    changing the identified one or more servers to a non-servicing state;
    sending incoming service requests to respective ones of the plurality of servers that are not in the non-servicing state;
    performing the garbage collection in respective ones of the identified one or more servers by:
        detecting, in a first server from the identified one or more servers, completion of processing of pending service requests; and
        initiating the garbage collection on the first server subsequent to the detecting after a random time interval subsequent to the detecting;
    changing respective ones of the identified one or more servers to a servicing state upon completion of the garbage collection on that server, the random time interval generated by an algorithm providing a selected mean value for the time interval to provide a probability that a target level of service is met; and
    processing the incoming service requests on the servers changed to the servicing state.

2. The method of claim 1, wherein the initiating the garbage collection comprises initiating the garbage collection after a random time interval subsequent to the detecting.

3. The method of claim 2, wherein the random time interval is determined based upon a level of available memory, and a rate of memory consumption for at least one of the identified one or more servers.

4. The method of claim 1, wherein the comparing comprises:
    determining, in one of the plurality of servers, a level of available memory; and
    comparing the determined level of available memory to an available memory threshold.

5. The method of claim 1, wherein the comparing comprises:
    determining, in one of the plurality of servers, a current rate of memory consumption; and
    comparing the determined current rate of memory consumption to a memory consumption rate threshold.

6. The method of claim 1, wherein the dynamically identifying comprises:
selecting one or more of the plurality of servers that have exceeded at least one of an available memory threshold and a memory consumption rate threshold.

7. The method of claim 6, wherein the available memory threshold and the memory consumption threshold are determined with respect to heap memory.

8. The method of claim 1, wherein the changing the identified one or more servers to the non-servicing state comprises:
setting, in each of the identified one or more servers, the non-servicing state in which no new service requests are processed; and
processing, in each of the identified one or more servers, pending service requests.

9. The method of claim 1, wherein the changing the identified one or more servers to the non-servicing state comprises:
setting, in an intermediate node between a client and the plurality of servers, the non-servicing state corresponding to each of the identified one or more servers, wherein no new service requests are processed in the non-servicing state; and
processing, in each of the identified one or more servers, pending service requests.

10. The method of claim 1, wherein the changing the identified one or more servers to the non-servicing state comprises:
setting, in a client, the non-servicing state corresponding to respective ones of the identified one or more servers, wherein no new service requests are processed in the non-servicing state; and
processing, in each of the identified one or more servers, pending service requests.

11. A system to process service requests, the system comprising:
a plurality of data processing devices executing instructions that configure the data processing devices to process the service requests and implement:
a memory monitoring module configured to compare usage of memory in respective ones of the plurality of data processing devices to one or more memory usage thresholds;
a garbage collection identifier module configured to:
dynamically identify, based upon the comparing, one or more data processing devices in which to perform garbage collection of memory objects; and
change the identified one or more data processing devices to a non-servicing state;
a service request dispatch module configured to send incoming service requests to respective ones of the plurality of data processing devices that are not in the non-servicing state;
a garbage collection pause reduction module configured to:
perform the garbage collection by;
detecting completion of processing of pending service requests; and
initiating the garbage collection after a random time interval subsequent to the detection;
change to a servicing state upon completion of the garbage collection on that data processing device, the random time interval generated by an algorithm providing a selected mean value for the time interval to provide a probability that a target level of service is met; and
process the service requests in the servicing state.

12. A computer program product comprising a non-transitory computer readable medium having computer program logic recorded thereon, that, when executed by a plurality of servers, cause the plurality of servers to process service requests, the computer program logic comprising:
a first logic module configured to:
compare usage of memory in respective ones of the plurality of servers to one or more memory usage thresholds;
a second logic module configured to:
dynamically identify, based upon the comparing, one or more servers in which to perform garbage collection of memory objects; and
change the identified one or more servers to a non-servicing state;
a third logic module configured to:
send incoming service requests to respective ones of the plurality of servers that are not in the non-servicing state; and
a fourth logic module configured to:
perform the garbage collection in respective ones of the identified one or more servers;
detect, in a first server from the identified one or more servers, completion of processing of pending service requests; and
initiate the garbage collection on the first server after a random time interval subsequent to the detecting;
change respective ones of the identified one or more servers to a servicing state upon completion of the garbage collection on that server, the random time interval generated by an algorithm providing a selected mean value for the time interval to provide a probability that a target level of service is met; and
process the service requests in the servicing state.

* * * * *